T. G. AICKIN.
GLASS TILES FOR DECORATIONS.

No. 176,730. Patented May 2, 1876.

Witnesses
John Deemer
Harry Smith

Thomas G. Aickin
by his Attorneys
Howson and Son

UNITED STATES PATENT OFFICE.

THOMAS G. AICKIN, OF PHILADELPHIA, PENNSYLVANIA.

IMPROVEMENT IN GLASS TILES FOR DECORATIONS.

Specification forming part of Letters Patent No. 176,730, dated May 2, 1876; application filed November 16, 1875.

*To all whom it may concern:*

Be it known that I, THOMAS G. AICKIN, of Philadelphia, Pennsylvania, have invented a Glass Tile for Decorations, of which the following is a specification:

The object of my invention is the economical manufacture of attractive ornamental tiles for decorative purposes; and this object I attain in the manner which I will now proceed to describe, reference being had to the accompanying drawing, in which—

Figure 1:
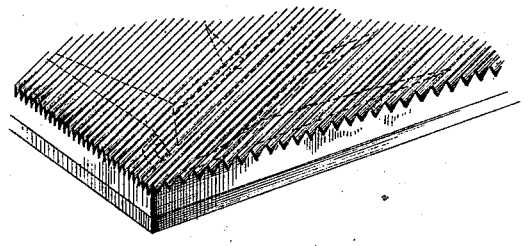
Figure 2:
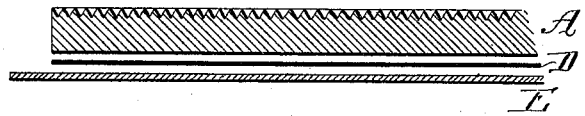

Figure 1 is a perspective view of sufficient of the tile to illustrate my invention, and Fig. 2 a vertical section of part of the tile, drawn to an enlarged scale.

I take a plate, A, of glass, the entire outer surface of which is ribbed or corrugated in parallel lines, as shown in Fig. 1. On the smooth back of the glass I paint, in such colors as taste and other circumstances may suggest, the ornamental design decided upon, the colors being by preference made permanent on the glass by the enameling or burning process practiced by glass-stainers. I then apply to the painted or enameled back of the glass a backing, D, of gold-leaf, silver-leaf, or a backing of pigment, which may or may not be burned on the glass, and finally, to protect the backing from the effects of exposure, I secure to the same by varnish, preferably such as is used in connection with the manufacture of rubber goods, foil E, of tin or other metal or alloy, taking care to turn the same up at the edges of the glass, and securing the turned-up edges by the varnish.

The corrugated face of the glass imparts to the tile a peculiar appearance, somewhat resembling, when backed with gold-leaf, the enameled bronzes made in Europe.

I claim as my invention—

1. As a new manufacture, a glass tile ornamented at the back and corrugated in front, as set forth.

2. The within-described glass tile, having a corrugated front, a design at the back, produced by painting or enameling or otherwise, and backing of metallic leaf or any suitable pigment, as set forth.

In testimony whereof I have signed my name to this specification in the presence of two subscribing witnesses.

THOS. G. AICKIN.

Witnesses:
ELLWOOD T. DEETZ,
HARRY SMITH.